United States Patent
Wegmann et al.

(10) Patent No.: US 10,492,242 B2
(45) Date of Patent: Nov. 26, 2019

(54) ENHANCED TIMER SETTING FOR MOBILITY ROBUSTNESS OPTIMIZATION

(71) Applicant: Nokia Solutions and Networks Oy, Espoo (FI)

(72) Inventors: Bernhard Wegmann, Holzkirchen (DE); Ahmad Awada, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/517,252

(22) PCT Filed: Mar. 12, 2015

(86) PCT No.: PCT/EP2015/055196
§ 371 (c)(1),
(2) Date: Apr. 6, 2017

(87) PCT Pub. No.: WO2016/055168
PCT Pub. Date: Apr. 14, 2016

(65) Prior Publication Data
US 2017/0251409 A1     Aug. 31, 2017

(30) Foreign Application Priority Data

Oct. 8, 2014  (WO) ................. PCT/EP2014/071488

(51) Int. Cl.
*H04W 76/18* (2018.01)
*H04W 36/08* (2009.01)
(Continued)

(52) U.S. Cl.
CPC ........... *H04W 76/18* (2018.02); *H04W 24/02* (2013.01); *H04W 36/0055* (2013.01);
(Continued)

(58) Field of Classification Search
CPC .. H04W 36/0055; H04W 36/08; H04W 24/02
(Continued)

(56) References Cited

U.S. PATENT DOCUMENTS

2015/0009941 A1*  1/2015  Pani .................. H04W 60/02
                                                       370/329
2015/0098448 A1*  4/2015  Xu ..................... H04W 24/10
                                                       370/331
(Continued)

FOREIGN PATENT DOCUMENTS

WO   WO 2011/134108 A1   11/2011

OTHER PUBLICATIONS

3GPP TSG-RAN WG2 Meeting #72bis, Ireland, Dublin, Jan. 17-Jan. 21, 2011, R2-110101, "Extension to Radio Link Failure Reporting for MDT and MRO", Huawei, HiSilicon, 5 pgs.
(Continued)

*Primary Examiner* — Inder P Mehra
(74) *Attorney, Agent, or Firm* — Harrington & Smith (57) ABSTRACT

The present invention provides apparatuses, methods, computer programs, computer program products and computer-readable media regarding enhanced timer setting for mobility robustness optimization. The present invention includes detecting, at a user equipment, establishment of a connection to a cell, determining, at the user equipment, whether the connection is established by a connection re-establishment procedure, detecting, at the user equipment, a radio link failure of the connection to the cell, and transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

20 Claims, 5 Drawing Sheets

(51) Int. Cl.
*H04W 24/02* (2009.01)
*H04W 76/19* (2018.01)
*H04W 36/00* (2009.01)
*H04W 36/30* (2009.01)

(52) U.S. Cl.
CPC ............ *H04W 36/08* (2013.01); *H04W 76/19* (2018.02); *H04W 36/0079* (2018.08); *H04W 36/305* (2018.08)

(58) Field of Classification Search
USPC ................ 455/436; 380/272; 340/539.19
See application file for complete search history.

(56) References Cited

U.S. PATENT DOCUMENTS

| | | | | |
|---|---|---|---|---|
| 2015/0133119 A1* | 5/2015 | Huang | .............. | H04W 36/0083 455/436 |
| 2015/0289141 A1* | 10/2015 | Ghasemzadeh | ....... | H04W 16/14 370/330 |
| 2016/0007407 A1* | 1/2016 | Christoffersson | ..... | H04W 76/38 370/329 |
| 2016/0014839 A1* | 1/2016 | Liu | ....................... | H04W 76/18 370/329 |
| 2016/0234739 A1* | 8/2016 | Puddle | .............. | H04W 36/0055 |

OTHER PUBLICATIONS

3GPP TS 36.331 V11.9.0 (Sep. 2014), "3$^{rd}$ Generation Partnership Project; Technical Specification Group Radio Access Network; Evolved Universal Terrestrial Radio Access (E-UTRA); Radio Resource Control (RRC); Protocol specification (Release 11)", 356 pgs.

Hamalainen, Seppo, et al., "LTE Self-Organising Networks (SON), © 2012 John Wiley & Sons, Ltd.", 35 pgs.

* cited by examiner

ENHANCED TIMER SETTING FOR MOBILITY ROBUSTNESS OPTIMIZATION

FIELD OF THE INVENTION

The present invention relates to apparatuses, methods, systems, computer programs, computer program products and computer-readable media regarding enhanced timer setting for mobility robustness optimization.

The technical field is mobile radio communications with focus on Radio Access Network (RAN) parameter optimization triggering cell handovers (HO) in an automated manner based on Self Organizing Networks (SON). The corresponding SON use case is Mobility Robustness Optimization (MRO), which is part of the 3GPP standard for LTE (Long-Term Evolution) technology since Release 9 and has been continuously enhanced and improved within the following releases (cf. document [1]).

Immediately after detecting a handover (or mobility) related Radio Link Failure (RLF), MRO is analyzing it in terms of following failure types:
  Too Late Handover (TLH)
  Too Early Handover (TEH)
  Handover to Wrong Cell (HWC)

To accomplish the distinction into these categories, a timer is needed which tells whether the RLF occurred shortly after a successful HO or whether the UE was already connected for quite a while and should have time to prepare the HO but missed the HO. The latter is declared as TLH. If an RLF occurs shortly after the successfully completed handover and the UE comes back to the source cell, the handover is declared as TEH as the target cell seems not yet stable enough. If UE however does not return to the source cell but tries to re-establish to another third cell, the failure is categorized as HWC. While in Release 9 this timer (Tstore_UE_cntxt) was hold and administered on network side, MRO has been enhanced with Release 10 using a UE based timer (TimeConnFailure) reported in the RLF report.

However, according to the specifications, the MRO timer "TimeConnFailure" is set within the RLF report only if an RRCConnectionReconfiguration message including the mobilityControlInfo was received before the connection failure and not when a cell change happens without a successful handover. This still leaves some room for mis-interpretation for MRO.

The addressed problem results from the fact that according to the standard as described in document [1], the timers for determining the variables "Tstore_UE_Cntxt" for network based solution and "TimeConnFailure" for UE based solution are only started with a handover initialization (i.e. with RRC-Connection-Reconfiguration message including the mobilityControlInfo), but not when cell change occurred without a handover initialization (see below the excerpt from the RRC Spec (TS 36.331) showing the description of the Information Element (IE) TimeConnFailure.

"timeConnFailure
  This field is used to indicate the time elapsed since the last HO initialization until connection failure. Actual value=IE value*100 ms. The maximum value 1023 means 102.3 s or longer."

A cell change without HO initialization can also occur when UE looses connection in the source cell and is able to successfully re-establish the connection in another cell (which might become rather relevant because of the context fetching feature). If an RLF occurs after a cell change without HO initialization the two variables "TimeConnFailure" and "previousPCellId" within RLF report will not be set and, therefore MRO has not enough information to correctly categorize this failure (see below the excerpt from the RRC Spec (TS 36.331) showing the description of the Information Element (IE) PreviousPCellID).

previousPCellId
  This field is used to indicate the source PCell of the last handover (source PCell when the last RRC-Connection-Reconfiguration message including mobilityControlInfowas received).

From the information "failedPCellId" in the RLF report it can be concluded if the failure belongs to the MRO use case, but MRO cannot detect and analyze the RLF according to the MRO failure types.

Figure 1:
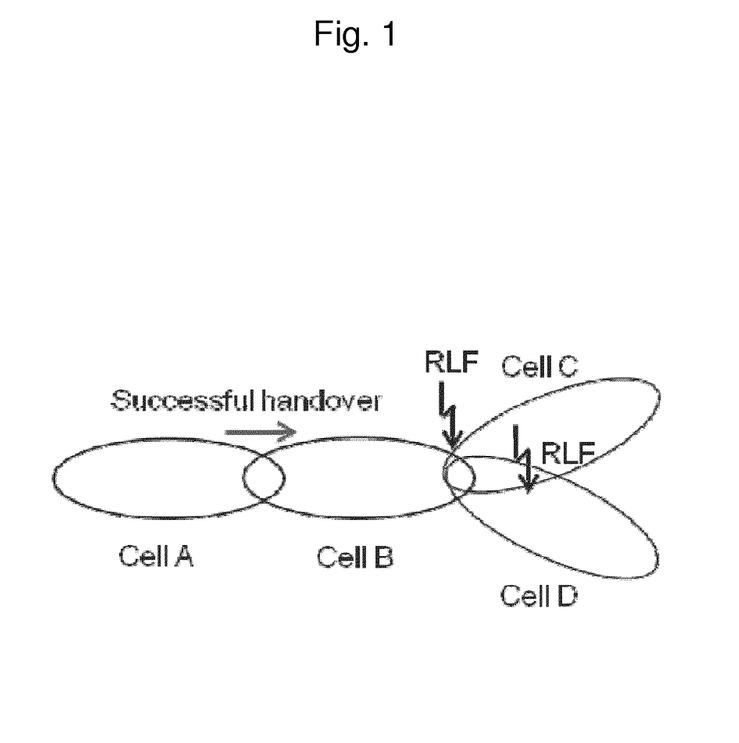
FIG. 1 is a diagram illustrating a problem of detecting a handover related radio link failure.

In order to illustrate such a problem, the following example depicted in FIG. 1 is considered. The UE has been successfully handed over from cell A to cell B and the timer which is responsible to determine the connection time until a failure occurs (this time is later stored in the variable "timeConnFailure" of the RLF report) has been started in the UE when it has received RRCConnectionReconfiguration message including the mobilityControlInfo from cell A. In cell B, the UE has experienced an RLF after some time duration T and consequently it has stopped the timer and set value T in the variable "timeConnFailure" of the RLF report. Afterwards the UE was able to successfully re-establish to cell C using RRC Connection Re-establishment procedure. The RLF report is completed with setting the variable "reestablishmentCellId" and is reported to cell C. The final analysis of the RLF report is carried out in cell B (the failedPCellId where RLF report has been forwarded to). Assuming that the analysis of TimeConnFailure has revealed that T was long enough ($T > T_{min}$), cell B has declared a TLH from cell B to C.

After being served by cell C for a while, the UE might experience again an RLF with subsequent re-establishment/reconnection to another cell D. Since the connection in cell C has not been initiated with a RRCConnectionReconfiguration message including the mobilityControlInfo the variable "TimeConnFailure" of the RLF report as well as the variable "previousPCellId" are not set with the occurrence of the RLF. The UE will send the RLF report to cell D after completing connection reestablishment which in turn sends an RLF indication to cell C (failedPCellId which has been set). As said, the information element "timeConnFailure" in the RLF report is now void (empty). Accordingly, the RLF occurring in cell C with re-establishment/re-connection to cell D would be realized as mobility issue but cannot be analyzed and identified properly by cell C without knowing the value of timeConnFailure, i.e., whether the RLF is caused by misconfigured handover parameters in cell C in a way that the handover was too late from C to D (if timeConnFailure>$T_{min}$) or a handover to wrong cell (if timeConnFailure<$T_{min}$ in cell C) when the time T was too short that cell C's handover parameters towards D could not be accused. As said, MRO's helplessness results from the fact that the preceding cell change was not due to successful handover but due to successful re-establishment from cell B.

One reason why the addressed problem has not been treated so far might be that experts have assumed that a cell change without HO initialization or connection setup after a call drop is a rather rare case which can be neglected and the MRO statistics for cell border in question are based on plenty of other UEs which might provide mobility failure information. But the situation will definitely change with context fetching.

Currently, there are two possible options how the problem can be treated. These options are listed below along with their disadvantages.

Option 1: The eNodeB receiving an RLF report (cell C in the example in FIG. 1) with void timeConnFailure variable ignores the entire RLF report.

In this case, MRO can only react subsequently with respect to the problem case described above. Only when the previous RLF (TLH from cell B to C in the example in FIG. 1) occurring in the preceding cell (cell B) is resolved, the mobility issue from C to D can be tackled by MRO. If MRO was able to correct mobility parameters of the preceding cell change resulting in successful handovers, the variable TimeConnFailure would be set and MRO would work.

This solution relies on the fact that the preceding cell B is able to resolve the TLH from B to C. However, each cell has its own propagation conditions and some mobility problems cannot be fixed in some cells due to trade-offs in the numbers of failures or in different SON use cases running in cell B (cf. document [2]). As such, if cell B cannot fix the problem, cell C will miss the chance to fix the TLH from cell C to cell D. If the user was staying long enough in cell C, the RLFs in cell B and cell C are independent from each other and should be treated as such, i.e., the detection of RLF in cell C should not depend on whether the preceding cell B is able to resolve the RLF or not. Moreover, such dependencies make MRO very slow and probably also unstable in terms of convergence.

Option 2: The eNodeB receiving an RLF report (cell C in the example in FIG. 1) with void timeConnFailure variable assumes blindly that the failure is a TLH.

This decision would be correct as long as the user has indeed stayed in the cell for more than $T_{min}$. However, if the user has stayed in the cell for a short time (less than $T_{min}$), the decision of the eNodeB is indeed not correct and might even worsen the situation, i.e. increasing for instance the number of TEH for UEs crossing the same cell border at different locations. Thus, a blind TLH decision could not be acceptable and therefore a setting of the variable "timeConnFailure" is also required for cell changes not being initiated with RRCConnectionReconfiguration message including the mobilityControlInfo to be able differentiate between mobility failure types.

[1] 3GPP TS 36.331, Radio Resource Control (RRC), Rel. 11

[2] LTE Self-Organizing Networks (SON): Network Management Automation for Operational Efficiency, Seppo Hamalainen, Henning Sanneck and Cinzia Sartori

SUMMARY OF THE INVENTION

It is therefore an object of the present invention to overcome the above mentioned problems and to provide apparatuses, methods, systems, computer programs, computer program products and computer-readable media regarding enhanced timer setting for mobility robustness optimization.

According to an aspect of the present invention there is provided a method comprising:
  detecting, at a user equipment, establishment of a connection to a cell,
  determining, at the user equipment, whether the connection is established by a connection re-establishment procedure,
  detecting, at the user equipment, a radio link failure of the connection to the cell, and
  transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

According to another aspect of the present invention there is provided a method comprising:
  receiving, at a first base station, a message informing the first base station that a radio link failure of a connection of a user equipment has occurred, and
  determining, by the first base station, based on an indication in the message, whether a radio link failure in the connection of the user equipment occurred within a predetermined time after the establishment of the connection by a connection re-establishment procedure.

According to another aspect of the present invention there is provided a method comprising:
  initializing, at a base station, a timer when receiving a connection re-establishment complete message from a user equipment, the connection re-establishment complete message indicating an establishment of a connection of a user equipment to the base station by a connection re-establishment procedure, wherein the timer expires after a predetermined time,
  receiving, at the base station, a radio link failure indication from the cell to which the user equipment is connected to, and
  determining, at the base station, whether the timer is still active or has already expired when receiving the indication.

According to another aspect of the present invention there is provided an apparatus for use in a user equipment, comprising:
  at least one processor, and
  at least one memory for storing instructions to be executed by the processor, wherein
  the at least one memory and the instructions are configured to, with the at least one processor, cause the apparatus at least to perform:
    detecting, at the user equipment, establishment of a connection to a cell,
    determining, at the user equipment, whether the connection is established by a connection re-establishment procedure,
    detecting, at the user equipment, a radio link failure of the connection to the cell, and
    transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

According to another aspect of the present invention there is provided an apparatus for use in a first base station, comprising:
  at least one processor, and
  at least one memory for storing instructions to be executed by the processor, wherein
  the at least one memory and the instructions are configured to, with the at least one processor, cause the apparatus at least to perform:

receiving, at the first base station, a message informing the first base station that a radio link failure of a connection of a user equipment has occurred, and determining, by the first base station, based on an indication in the message, whether a radio link failure in the connection of the user equipment occurred within a predetermined time after the establishment of the connection by a connection re-establishment procedure.

According to another aspect of the present invention there is provided an apparatus for use in a base station, comprising:

at least one processor, and at least one memory for storing instructions to be executed by the processor, wherein the at least one memory and the instructions are configured to, with the at least one processor, cause the apparatus at least to perform:

initializing, at the base station, a timer when receiving a connection re-establishment complete message from a user equipment, the connection re-establishment complete message indicating an establishment of a connection of a user equipment to the base station by a connection re-establishment procedure, wherein the timer expires after a predetermined time, receiving, at the base station, a radio link failure indication from the cell to which the user equipment is connected to, and determining, at the base station, whether the timer is still active or has already expired when receiving the indication.

According to another aspect of the present invention there is provided an apparatus, comprising:

means for detecting, at a user equipment, establishment of a connection to a cell, means for determining, at the user equipment, whether the connection is established by a connection re-establishment procedure, means for detecting, at the user equipment, a radio link failure of the connection to the cell, and means for transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

According to another aspect of the present invention there is provided an apparatus, comprising:

means for receiving, at a first base station, a message informing the first base station that a radio link failure of a connection of a user equipment has occurred, and means for determining, by the first base station, based on an indication in the message, whether a radio link failure in the connection of the user equipment occurred within a predetermined time after the establishment of the connection by a connection re-establishment procedure.

According to another aspect of the present invention there is provided an apparatus, comprising:

means for initializing, at a base station, a timer when receiving a connection re-establishment complete message from a user equipment, the connection re-establishment complete message indicating an establishment of a connection of a user equipment to the base station by a connection re-establishment procedure, wherein the timer expires after a predetermined time, means for receiving, at the base station, a radio link failure indication from the cell to which the user equipment is connected to, and means for determining, at the base station, whether the timer is still active or has already expired when receiving the indication.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to some example versions of the present invention, it is an object to enhance the current MRO root cause analysis and to ensure better network tuning and settings.

In order to achieve this, according to some example versions of the present invention, an enhancement of the RLF report generation is proposed that MRO is also able to distinguish the MRO failure types if connection in the cell has not been initiated with successful handover. For that case, the UE has to be enabled to determine the time elapsed since the RRC Connection Re-establishment Complete message sent by the UE during RRC Connection Re-establishment procedure until RLF and to set this measured time in an variable (e.g. in "timeConnFailure") at the moment when a RLF is detected. In addition, the variable "previousPCel-lID" has to be set for this cell change without handover initiation. Furthermore, the introduction of new IEs will allow precisely identifying mobility related failures either as a too late handover which could be treated independent from any preceding RLF or as an RLF occurring shortly after an RRC Connection Re-establishment procedure. The important point is to start a timer when the UE sends an RRC Connection Re-establishment Complete message to the eNodeB and to stop it when an RLF occurs.

Basically, according to some example versions of the present invention, there are several implementation solutions which finally allow a unique identification of the addressed failure case, which will be described in the following.

Solution A:

A first solution A according to example versions of the present invention is aligned with the evolved UE-based MRO approach as specified with Release 10ff where all necessary information needed for the root cause analysis is recorded in the RLF report (in detail in the variable VarRLF-Report being stored in UE).

According to a first alternative, the time variable set in the RLF report which expresses the time between the 'RRC Connection Re-establishment Complete' message sent to the eNodeB and the occurrence of an RLF is stored in the existing IE "timeConnFailure-r10" in the RLF report. In order to provide additional information how the connection has been initiated either by handover or by RRC Connection Re-establishment another IE should be added to the variable VarRLF-Report, for instance, called "ConnEstabType" specified as ENUM data type.

According to a second alternative, a new IE to existing IE "timeConnFailure-r10" is added to the RLF report which explicitly expresses the time between the 'RRC Connection Re-establishment Complete message' sent to the eNodeB and the occurrence of an RLF The IE could be, for instance, called "timeRe-EstabFailure".

According to a third alternative, the UE already takes over some part of the root cause analysis with the advantage that only a short ENUM variable (e.g. ConnectionRe-establishmentTimer{ON; OFF}) is needed instead of the time information stored either in the IE "timeConnFailure"

or IE "timeRe-EstabFailure". A timer in the UE which expires after "timeRe-EstabFailure_thr", is started by the UE upon the transmission of an 'RRC Connection Re-establishment Complete' message to the eNodeB after an RLF. If a new RLF occurs after the timer had expired, the new ENUM variable "ConnectionRe-establishmentTimer" is set to OFF, otherwise if the RLF occurred when the timer is still running the variable "ConnectionRe-establishment-Timer" is set to ON. This implementation requires that the UE is notified by the network via a System Information Block (SIB) or dedicated RRC signalling about the threshold "timeRe-EstabFailure_thr" to determine when the timer expires.

All three alternatives provide the information about the time between the 'RRC Connection Re-establishment Complete' message and RLF, i.e. after a non handover initiated cell change. Thus, in addition to the determination of the MRO failure cases the information about the previous connection setup is available for more detailed root cause analysis. The eNodeB processing the RLF report will read the ENUM "ConnectionRe-establishment-Timer" or ENUM "ConnEstabType" or "timeRe-EstabFailure". Based on this new IE, the eNB is able to decide whether the RLF has occurred shortly after an RRC Connection Re-establishment procedure or not.

The following excerpt from TS 36.331 shows a proposal of the proposed extended RLF report (extension in italic and underlined and alternatives in bold) given as (Abstract Syntax Notation One) ASN.1 code.

```
RLF-Report-r9 ::=                SEQUENCE {
    measResultLastServCell-r9        SEQUENCE {
        rsrpResult-r9                    RSRP-Range,
        rsrqResult-r9                    RSRQ-Range          OPTIONAL
    },
    measResultNeighCells-r9          SEQUENCE {
        measResultListEUTRA-r9           MeasResultList2EUTRA-r9
OPTIONAL,
        measResultListUTRA-r9            MeasResultList2UTRA-r9
OPTIONAL,
        measResultListGERAN-r9           MeasResultListGERAN
OPTIONAL,
        measResultsCDMA2000-r9           MeasResultList2CDMA2000-r9
OPTIONAL
    }   OPTIONAL,
    ...,
    [[  locationInfo-r10             LocationInfo-r10    OPTIONAL,
        failedPCellId-r10                CHOICE {
            cellGlobalId-r10                 CellGlobalIdEUTRA,
            pci-arfcn-r10                    SEQUENCE {
                physCellId-r10                   PhysCellId,
                carrierFreq-r10                  ARFCN-ValueEUTRA
            }
        }                                                    OPTIONAL,
        reestablishmentCellId-r10        CellGlobalIdEUTRA    OPTIONAL,
        timeConnFailure-r10              INTEGER (0..1023)    OPTIONAL,
        connectionFailureType-r10        ENUMERATED {rlf, hof}    OPTIONAL,
        previousPCellId-r10              CellGlobalIdEUTRA        OPTIONAL
    ]],
    [[  c-RNTI-r11                   C-RNTI                   OPTIONAL,
        rlf-Cause-r11                    ENUMERATED {
                                             t310Expiry, randomAccessProblem,
                                             rlc-MaxNumRetx, spare1}    OPTIONAL,
        timeSinceFailure-r11             TimeSinceFailure-r11    OPTIONAL,
        previousUTRA-CellId-r11          SEQUENCE {
            carrierFreq-r11                  ARFCN-ValueUTRA,
            physCellId-r11                   CHOICE {
                fdd-r11                          PhysCellIdUTRA-FDD,
                tdd-r11                          PhysCellIdUTRA-TDD
            },
            cellGlobalId-r11                 CellGlobalIdUTRA    OPTIONAL
        }                                                        OPTIONAL,
        selectedUTRA-CellId-r11          SEQUENCE {
            carrierFreq-r11                  ARFCN-ValueUTRA,
            physCellId-r11                   CHOICE {
                fdd-r11                          PhysCellIdUTRA-FDD,
                tdd-r11                          PhysCellIdUTRA-TDD
            }
        }                                                        OPTIONAL
    ]],
    [[  timeRe-EstabFailure-rxx      INTEGER (0..1023)          OPTIONAL,
    Or alternatively
        connEstabType-rxx            ENUMERATED {
                                         Handover
                                         Re-establishment}OPTIONAL,
    Or alternatively
        ConnectionRe-establishmentTimer-rxx   ENUMERATED {
                                         ON
                                         OFF}                   OPTIONAL,
    ]]
}
```

As described above, it is proposed to add one of a new IE "timeRe-EstabFailure-rxx", "connEstabType-rxx" or "ConnectionRe-establishmentTimer-rxx".

Note that "previousPCellId" IE should indicate in this case either the global cell ID of the source cell of the last successful handover (source PCell when the last RRC-Connection-Reconfiguration message including mobilityControlInfo was received) or the global cell ID of the source cell in which the UE has previously failed (cell B in the example in FIG. 1) prior to the new RLF experienced in the cell with failedPCellId (cell C in the example in FIG. 1).

The analysis phase for this option can be carried out either in the eNB where the failure occurred (in the following called method A-1) or directly in the eNB retrieving the RLF report (in the following called method A-2). If the two cells where RLF occurred and the RLF report has been retrieved are served by the same eNB, the inter-node communication is not needed.

Method A-1 (as Currently Used for MRO):

Following the MRO philosophy, the eNodeB (cell D in the example in FIG. 1) receiving the RLF report from the UE sends an RLF INDICATION message comprising the RLF report to the eNodeB (cell C in the example in FIG. 1) serving the source cell where the RLF occurred (indicated by the IE "failedPCellId"). By analysing and processing the RLF report including one of the following three new IE: IE "timeRe-EstabFailure-rxx" or "connEstabType-rxx" or "ConnectionRe-establishmentTimer-rxx", the eNB is able to identify whether the RLF has occurred shortly after an RRC Connection Re-establishment procedure or a connection establishment after successful handover. The processing of the RLF report depends on the IE used in the implementation:

Case 1: The New IE is "timeRe-EstabFailure-rxx"

If the value in the new IE "timeRe-EstabFailure-rxx", containing a value which is larger than zero, is greater than the predefined threshold "timeRe-EstabFailure_thr" (timeRe-EstabFailure-rxx>timeRe-EstabFailure_thr), the eNodeB will consider the RLF as a TLH. If the value is less than the predefined threshold (timeRe-EstabFailure-rxx<timeRe-EstabFailure_thr), the eNodeB will consider the RLF to have occurred shortly after an RRC connection re-establishment and sends a HO report to the source cell (cell B in the example in FIG. 1) in which the UE has previously failed prior to the new RLF experienced in the cell with failedPCellId and sets the Handover Report Type to a new type called for instance "RLFShortlyAfterReestablisment".

The enhancements to existing Handover Report are highlighted in italic and underlined in Table 1. Note that the Source cell ECGI (Evolved Cell Global Identifier) of the handover report is extended to include the EGCI of source cell in which the UE has previously failed prior the new RLF in cell with Failure cell EGCI as shown in italic and underlined in Table 1.

| IE/Group Name | Presence | Range | IE type and reference | Semantics description | Criticality | Assigned Criticality |
|---|---|---|---|---|---|---|
| Message Type | M | | 9.2.13 | | YES | ignore |
| Handover Report Type | M | | ENUMERATED (HO too early, HO to wrong cell, *RLFShortlyAfterReestablishment*, . . . , InterRAT ping-pong) | | YES | ignore |
| Handover Cause | M | | Cause 9.2.6 | Indicates handover cause employed for handover from eNB$_2$ | YES | ignore |
| Source cell ECGI | M | | ECGI 9.2.14 | ECGI of source cell for handover procedure (in eNB$_2$) *or EGCI of source cell in which the UE has previously failed prior the new RLF in cell with Failure cell EGCI*. | YES | ignore |
| Failure cell ECGI | M | | ECGI 9.2.14 | ECGI of target cell for handover procedure (in eNB$_1$) | YES | ignore |
| Re-establishment cell ECGI | C-ifHandoverReportType HoToWrongCell, *or RLFShortlyAfterReestablishment* | | ECGI 9.2.14 | ECGI of cell where UE attempted re-establishment | YES | ignore |
| Target cell in UTRAN | C-ifHandoverReportType InterRATpingpong | | OCTET STRING | Encoded according to *UTRAN Cell ID* in the *Last Visited UTRAN Cell Information* IE, as defined in in TS 25.413 [24] | YES | ignore |
| Source cell C-RNTI | O | | BIT STRING (SIZE (16)) | C-RNTI allocated at the source eNB (in eNB$_2$) contained in the AS-config (TS 36.331 [9]). | YES | ignore |

| IE/Group Name | Presence | Range | IE type and reference | Semantics description | Criticality | Assigned Criticality |
|---|---|---|---|---|---|---|
| Mobility Information | O | | BIT STRING (SIZE (32)) | Information provided in the HANDOVER REQUEST message from eNB$_2$. | YES | ignore |
| UE RLF Report Container | O | | OCTET STRING | The UE RLF Report Container IE received in the RLF INDICATION message. | YES | ignore |

Case 2: The New IE is "connEstabType-rxx"

In this case, the eNodeB has to process "connEstabType-rxx" in combination with "timeConnFailure-r10". If "timeConnFailure-r10" is less than "timeRe-EstabFailure_thr" and "connEstabType-rxx"=Re-establishment, the eNodeB will consider the RLF that has been occurred shortly after an RRC Connection Reestablishment procedure as a re-establishment to the wrong cell. In this case, the eNodeB sends a HO report to the cell where the RLF occurred with a new specific Handover Report Type, for instance, called "RLF-ShortlyAfterRe-establishment", see HO report in Table 1. If "timeConnFailure-r10" is greater than "timeRe-EstabFailure_thr", the eNodeB will consider the RLF as a TLH.

Case 3: The New IE is "ConnectionRe-establishmentTimer-rxx"

If "ConnectionRe-establishmentTimer-rxx"=ON, the eNodeB will consider the RLF to have occurred shortly after an RRC Connection Re-establishment procedure. In this case, the eNodeB sends a HO report with Handover Report Type set to "RLFShortlyAfterRe-establishment". If "ConnectionRe-establishmentTimer-rxx"=OFF, the eNodeB will consider the RLF as a TLH.

Method A-2:

According to the method A-2, which does not perfectly follow the current MRO philosophy, the failure analysis can alternatively also be carried out in the eNB retrieving the RLF report after re-connection (cell D in the example in FIG. 1). The eNB would also be able to analyse the new proposed IE, and could identify whether this RLF occurred shortly after an RRC Connection Reestablishment procedure or not. If the RLF is identified as TLH, the eNodeB (cell D in the example in FIG. 1) sends an RLF indication to the eNodeB (cell C in the example in FIG. 1) serving the cell where the UE has experienced the last RLF (cell with failedPCellId). Otherwise the eNodeB retrieving the RLF report sends a HO Report message to the eNodeB serving the source cell (cell B in the example in FIG. 1) (cell with previousPCellId) with Handover Report Type set to "RLF-ShortlyAfterRe-establishment", see HO report in Table 1.

In case that both cells are served by the same eNB, the inter-node communication, i.e. either RLF INDICATION message or HO REPORT message is not needed.

Analysis of RLF report with respect to the new IE "timeRe-EstabFailure-rxx" or "connEstabType-rxx" or "ConnectionRe-establishmentTimer-rxx" is carried out and subsequent treatment is performed internally in eNB.

Solution B:

A second solution B according to some example versions of the present invention is an alternative network based solution following the old Release 9 concept where the time is measured on eNB side (comparable with Tstore_UE_cntxt which is used for MRO Release 9). This new timer could be started on eNB side (cell C in the example in FIG. 1) upon the reception of an RRC Connection Re-establishment Complete from the UE and is stopped when the RLF INDICATION message is received indicating an RLF with re-establishment/re-connection at different cell. The timer either expires after a certain time when the UE is connected long enough without failure or is stopped before expiration by a receiving an RLF INDICATION message from the cell (cell D in the example in FIG. 1) where the RLF report has been retrieved. For the latter case, the time between RRC Connection Re-establishment and RLF can only be estimated, since the time when the timer is stopped by the RLF INDICATION message contains also the time needed for RLF report retrieval and processing as well as the transmission time of RLF INDICATION message itself.

Therefore, the second solution B according to example versions of the present invention is less accurate but works with current standardization means.

Thus, in summary, according to some example versions of the present invention, there are proposed enhancements of the generation of the RLF report that allow determining the time elapsed since the RRC Connection Re-establishment Complete message sent by the UE during RRC Connection Re-establishment procedure until RLF as well as introducing new IEs which allow to precisely identify mobility related failures either as a too late handover which could be treated independent from a preceding TLH or as an RLF occurring shortly after an RRC Connection Re-establishment procedure.

In the following, a more general description of example versions of the present invention is made with respect to FIGS. 2 to 5.

Figure 2:
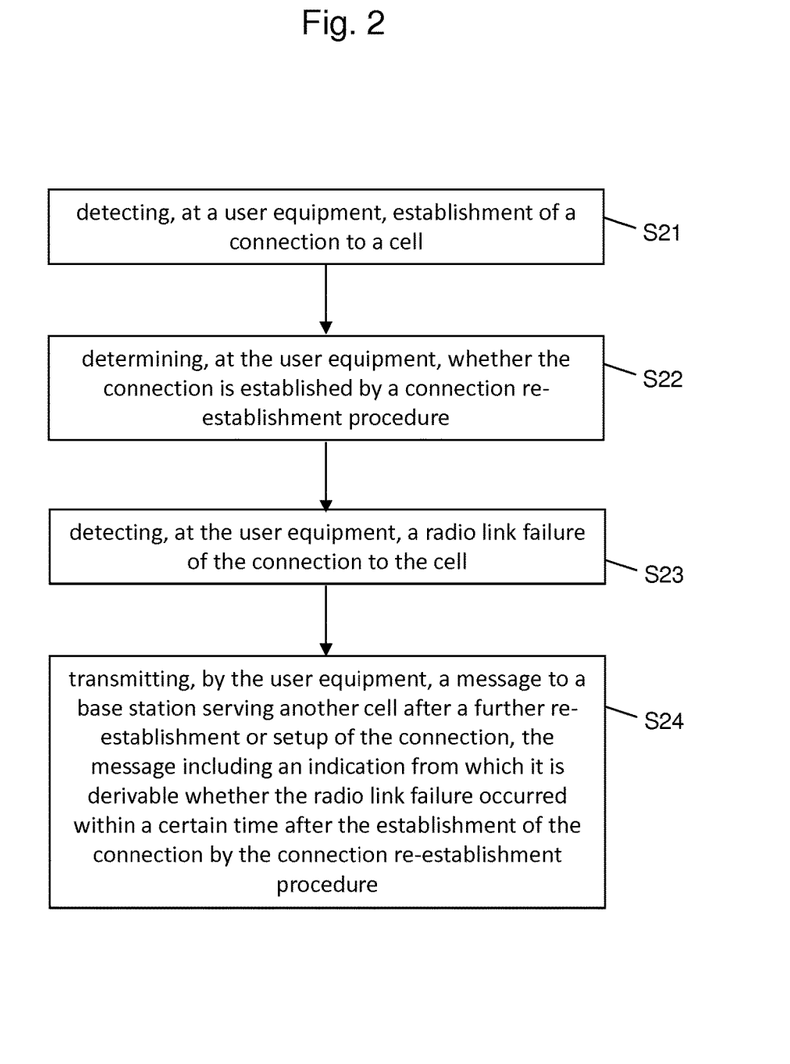
FIG. 2 is a flowchart illustrating an example of a method according to example versions of the present invention.

FIG. 2 is a flowchart illustrating an example of a method according to example versions of the present invention.

According to example versions of the present invention, the method may be implemented in a user equipment or the like. The method comprises detecting, at a user equipment, establishment of a connection to a cell in a step S21, determining, at the user equipment, whether the connection is established by a connection re-establishment procedure in a step S22, and detecting, at the user equipment, a radio link failure of the connection to the cell in a step S23. Further, the method comprises transmitting, by the user equipment, a message to a base station serving another cell after a further re-establishment or setup of the connection, the message including an indication from which it is derivable whether the radio link failure occurred within a certain time after the establishment of the connection by the connection re-establishment procedure in a step S24.

According to example versions of the present invention, the method further comprises initializing, at the user equipment, a timer when detecting the establishment of the connection to the cell by the connection re-establishment procedure, stopping, at the user equipment, the timer when detecting the radio link failure of the connection to the cell, wherein the indication in the message is the time measured by the timer.

According to example versions of the present invention, the method further comprises initializing, at the user equipment, a timer when detecting the establishment of the connection to the cell, stopping, at the user equipment, the timer when detecting the radio link failure of the connection to the cell, and when the connection is established by the connection re-establishment procedure, setting a parameter indicating that the connection is established by the connection re-establishment procedure, wherein the indication in the message is the time measured by the timer and the parameter.

According to example versions of the present invention, the method further comprises initializing, at the user equipment, a timer when detecting the establishment of the connection to the cell by the connection re-establishment procedure, determining, at the user equipment, whether the timer has expired when detecting the radio link failure of the connection to the cell, setting, at the user equipment, a parameter indicating whether the timer has expired or not when detecting the radio link failure, wherein the indication in the message is the parameter.

According to example versions of the present invention, the method further comprises receiving, at the user equipment, a threshold value of the timer from the network in order to determine whether the timer has expired.

Figure 3:
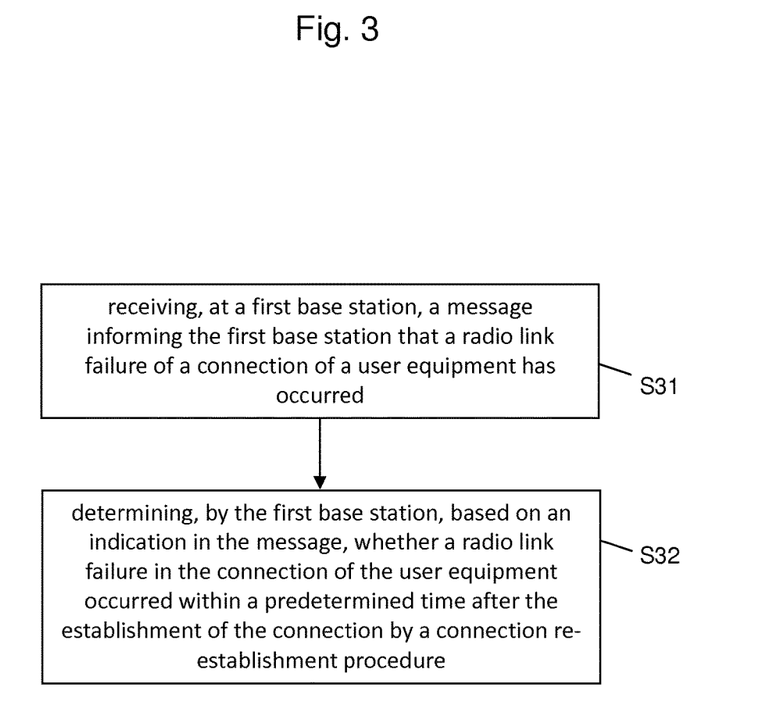
FIG. 3 is a flowchart illustrating an example of another method according to example versions of the present invention.

FIG. 3 is a flowchart illustrating another example of a method according to example versions of the present invention.

According to example versions of the present invention, the method may be implemented in a base station, like a NodeB or eNB or the like. The method comprises receiving, at a first base station, a message informing the first base station that a radio link failure of a connection of a user equipment has occurred in a step S31, and determining, by the first base station, based on an indication in the message, whether a radio link failure in the connection of the user equipment occurred within a predetermined time after the establishment of the connection by a connection re-establishment procedure in a step S32.

According to example versions of the present invention, the method further comprises deriving, by the first base station, a timer value included in the message received from the user equipment, the timer value indicating a time between establishment of the connection of the user equipment and the radio link failure, comparing the timer value with a threshold, deriving, by the first base station, a parameter included in the message received from the user equipment, the parameter indicating that the connection is established by the connection re-establishment procedure, determining, by the first base station, whether the radio link failure occurred within a predetermined time after the establishment of the connection by the connection re-establishment procedure based on the comparison and the parameter.

According to example versions of the present invention, if the timer value is less than the threshold and if the parameter indicates that the connection is established by the connection re-establishment procedure, it is determined that the radio link failure occurred within the predetermined time after the establishment of the connection by the connection re-establishment procedure.

According to example versions of the present invention, the method further comprises deriving, by the first base station, a timer value included in the message received from the user equipment, the timer value indicating a time between establishment of the connection of the user equipment by the connection re-establishment procedure and a radio link failure, comparing the timer value with a threshold, and determining whether the radio link failure occurred within the predetermined time after the establishment of the connection based on the comparison.

According to example versions of the present invention, if the timer value is less than the threshold, it is determined that the radio link failure occurred within the predetermined time.

According to example versions of the present invention, the method further comprises deriving, by the first base station, a parameter included in the message received from the user equipment, the parameter directly indicating whether the radio link failure occurred within the predetermined time after the establishment of the connection by the connection re-establishment procedure.

According to example versions of the present invention, the first base station is a base station at which the radio link failure occurred and receives the message from a second base station to which the user equipment is currently connected to.

According to example versions of the present invention, the method further comprises, if it is determined that the radio link failure in the connection of the user equipment occurred within a predetermined time after the establishment of the connection by a connection re-establishment procedure, sending, by the first base station, a message to a third base station from which the user equipment has re-established to the first base station indicating that the radio link failure occurred within the predetermined time after the establishment of the connection by the connection re-establishment procedure.

According to example versions of the present invention, the first base station is a base station to which the user equipment is currently connected to and receives the message from the user equipment.

According to example versions of the present invention, the method further comprises, if it is determined that the radio link failure in the connection of the user equipment occurred within a predetermined time after the establishment of the connection by a connection re-establishment procedure, forwarding, by the first base station, a message to a third base station from which the user equipment has re-established to a second base station at which the radio link failure occurred indicating that the radio link failure in the connection of the user equipment occurred within the predetermined time after the establishment of the connection by the connection re-establishment procedure.

According to example versions of the present invention, the method further comprises, if it is determined by the first base station, based on the indication, that the radio link failure did not occur within the predetermined time after the establishment of the connection by the connection re-establishment procedure, sending a message to the second base station at which the RLF occurred indicating a handover related radio link failure.

Figure 4:
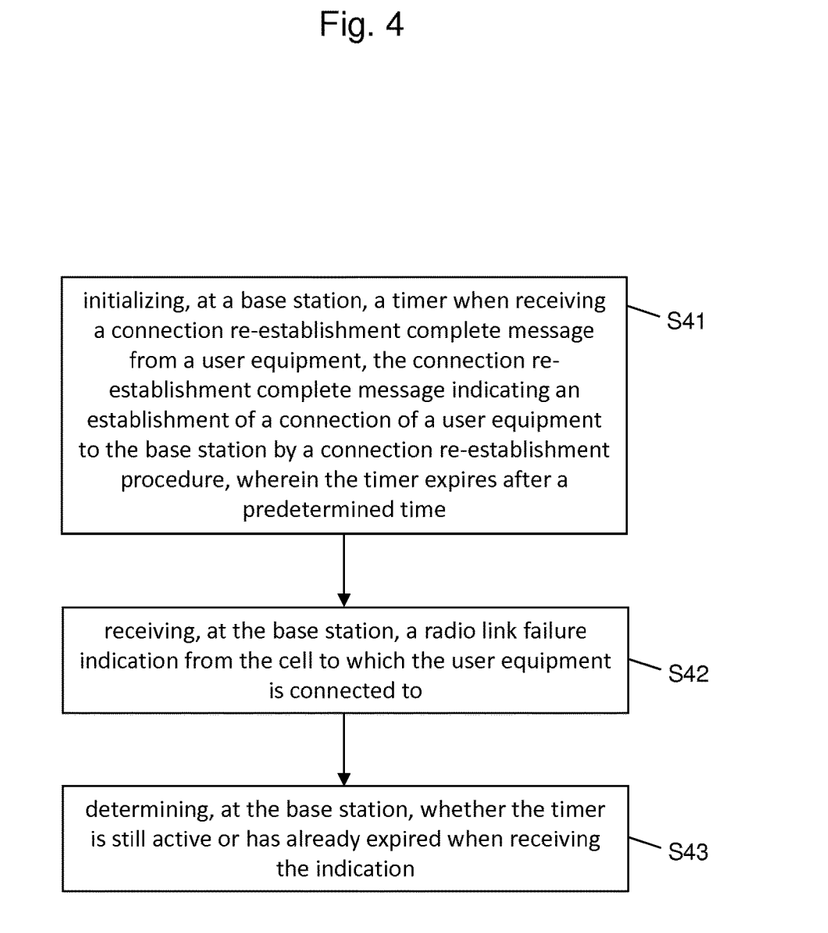
FIG. 4 is a flowchart illustrating an example of another method according to example versions of the present invention.

FIG. 4 is a flowchart illustrating an example of a method according to example versions of the present invention.

According to example versions of the present invention, the method may be implemented in a base station, like an eNB or the like. The method comprises initializing, at a base station, a timer when receiving a connection re-establishment complete message from a user equipment, the connection re-establishment complete message indicating an establishment of a connection of a user equipment to the base station by a connection re-establishment procedure, wherein the timer expires after a predetermined time in a step S41, receiving, at the base station, a radio link failure indication from the cell to which the user equipment is connected to in a step S42, and determining, at the base station, whether the timer is still active or has already expired when receiving the indication in a step S43.

Figure 5:
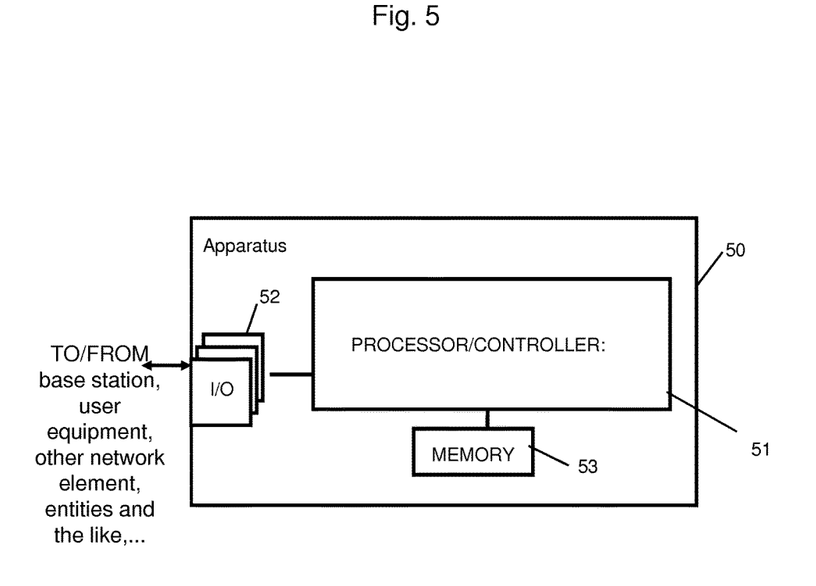
FIG. 5 is block diagram illustrating an example of an apparatus according to example versions of the present invention.

FIG. 5 is a block diagram showing an example of an apparatus according to example versions of the present invention.

In FIG. 5, a block circuit diagram illustrating a configuration of an apparatus 50 is shown, which is configured to implement the above described aspects of the invention. It is to be noted that the apparatus 50 shown in FIG. 5 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 50 may comprise a processing function or processor 51, such as a CPU or the like, which executes instructions given by programs or the like. The processor 51 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 52 denotes transceiver or input/output (I/O) units (interfaces) connected to the processor 51. The I/O units 52 may be used for communicating with one or more other network elements, entities, terminals or the like. The I/O units 52 may be a combined unit comprising communication equipment towards several network elements, or may comprise a distributed structure with a plurality of different interfaces for different network elements. Reference sign 53 denotes a memory usable, for example, for storing data and programs to be executed by the processor 51 and/or as a working storage of the processor 51.

The processor 51 is configured to execute processing related to the above described aspects. In particular, the apparatus 50 may be implemented in or may be part of a user equipment or the like, and may be configured to perform a method as described in connection with FIG. 2. Thus, the processor 51 is configured to perform detecting, at a user equipment, establishment of a connection to a cell, determining, at the user equipment, whether the connection is established by a connection re-establishment procedure, detecting, at the user equipment, a radio link failure of the connection to the cell, and transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

According to other example versions of the present invention, the apparatus 50 may be implemented in or may be part of base station or the like, and may be configured to perform a method as described in connection with FIG. 3. Thus, the processor 51 is configured to perform receiving, at a first base station, a message informing the first base station that a radio link failure of a connection of a user equipment has occurred, and determining, by the first base station, based on an indication in the message, whether a radio link failure in the connection of the user equipment occurred within a predetermined time after the establishment of the connection by a connection re-establishment procedure.

According to other example versions of the present invention, the apparatus 50 may be implemented in or may be part of base station or the like, and may be configured to perform a method as described in connection with FIG. 4. Thus, the processor 51 is configured to perform initializing, at a base station, a timer when receiving a connection re-establishment complete message from a user equipment, the connection re-establishment complete message indicating an establishment of a connection of a user equipment to the base station by a connection re-establishment procedure, wherein the timer expires after a predetermined time, receiving, at the base station, a radio link failure indication from the cell to which the user equipment is connected to, and determining, at the base station, whether the timer is still active or has already expired when receiving the indication.

For further details regarding the functions of the apparatus 50, reference is made to the description of the method according to example versions of the present invention as described in connection with FIGS. 2 to 4.

Thus, it is noted that the apparatus for use in a user equipment and the apparatus for use in a base station, generally have the same structural components, wherein these components are configured to execute the respective functions of the user equipment or base station, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that
    method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved; generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
   detecting, at a user equipment, establishment of a connection to a cell,
   determining, at the user equipment, the connection is established by a connection re-establishment procedure,
   detecting, at the user equipment, a radio link failure of the connection to the cell, and
   transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

2. The method according to claim 1, further comprising
   initializing, at the user equipment, a timer in response to detecting the establishment of the connection to the cell by the connection re-establishment procedure,
   stopping, at the user equipment, the timer in response to detecting the radio link failure of the connection to the cell, wherein
   the indication in the message is the time measured by the timer.

3. The method according to claim 1, further comprising
   initializing, at the user equipment, a timer in response to detecting the establishment of the connection to the cell,
   stopping, at the user equipment, the timer in response to detecting the radio link failure of the connection to the cell, and
   in response to the connection being established by the connection re-establishment procedure, setting a parameter indicating that the connection is established by the connection re-establishment procedure, wherein the indication in the message is the time measured by the timer and the parameter.

4. The method according to claim 1, further comprising
   initializing, at the user equipment, a timer in response to detecting the establishment of the connection to the cell by the connection re-establishment procedure,
   determining, at the user equipment, whether the timer has expired in response to detecting the radio link failure of the connection to the cell,
   setting, at the user equipment, a parameter indicating whether the timer has expired or not in response to detecting the radio link failure, wherein the indication in the message is the parameter.

5. The method of claim 1, where the connection is established by the connection re-establishment procedure without a handover initiation procedure.

6. A method, comprising:
   receiving, at a first base station, a message including an indication from which it is derivable whether a radio link failure occurred within a certain time after an establishment of a connection by a user equipment by a connection re-establishment procedure, determining, by the first base station, based on the indication in the message, whether the radio link failure in the connection of the user equipment occurred within the predetermined time after the establishment of the connection by the connection re-establishment procedure.

7. The method according to claim 6, further comprising:
deriving, by the first base station, a timer value included in the message received from the user equipment, the timer value indicating a time between the establishment of the connection of the user equipment and the radio link failure,
comparing the timer value with a threshold,
deriving, by the first base station, a parameter included in the message received from the user equipment, the parameter indicating that the connection is established by the connection re-establishment procedure,
determining, by the first base station, whether the radio link failure occurred within the predetermined time after the establishment of the connection by the connection re-establishment procedure based on the comparison and the parameter.

8. The method according to claim 7, wherein in response to the timer value being less than the threshold and in response to the parameter indicating that the connection is established by the connection re-establishment procedure, it is determined that the radio link failure occurred within the predetermined time after the establishment of the connection by the connection re-establishment procedure.

9. The method according to claim 6, further comprising:
deriving, by the first base station, a timer value included in the message received from the user equipment, the timer value indicating a time between establishment of the connection of the user equipment by the connection re-establishment procedure and the radio link failure,
comparing the timer value with a threshold, and
determining whether the radio link failure occurred within the predetermined time after the establishment of the connection based on the comparison.

10. The method according to claim 9, wherein
in response to the timer value being less than the threshold, it is determined that the radio link failure occurred within the predetermined time.

11. A method according to claim 6, wherein
the first base station is a base station at which the radio link failure occurred and the first base station receives the message from a second base station to which the user equipment is currently connected.

12. The method according to claim 11, further comprising
in response to it being determined that the radio link failure in the connection of the user equipment occurred within the predetermined time after the establishment of the connection by the connection re-establishment procedure, sending, by the first base station, a message to a third base station from which the user equipment had previously re-established to the first base station indicating that the radio link failure occurred within the predetermined time after the establishment of the connection by the connection re-establishment procedure.

13. The method according to claim 6, wherein
the first base station is a base station to which the user equipment is currently connected and the first base station receives the message from the user equipment.

14. The method according to claim 13, further comprising
in response to it being determined that the radio link failure in the connection of the user equipment occurred within the predetermined time after the establishment of the connection by the connection re-establishment procedure, forwarding, by the first base station, a message to a third base station from which the user equipment had previously re-established to a second base station at which the radio link failure occurred, the radio link failure causing the establishment of the connection by the user equipment to the first base station, the message indicating that the radio link failure in the connection of the user equipment occurred within the predetermined time after the establishment of the connection by the connection re-establishment procedure.

15. The method according to claim 13, further comprising:
in response to it being determined by the first base station, based on the indication, that the radio link failure did not occur within the predetermined time after the establishment of the connection by the connection re-establishment procedure, sending a message to a second base station at which the radio link failure occurred indicating a handover related radio link failure.

16. An apparatus for use in a user equipment, comprising:
at least one processor, and
at least one memory for storing instructions to be executed by the processor, wherein the at least one memory and the instructions are configured to, with the at least one processor, cause the apparatus at least to perform:
detecting, at the user equipment, establishment of a connection to a cell,
determining, at the user equipment, the connection is established by a connection re-establishment procedure,
detecting, at the user equipment, a radio link failure of the connection to the cell, and
transmitting, by the user equipment, a message to a base station serving another cell after a further re-establishment or setup of the connection, the message including an indication from which it is derivable whether the radio link failure occurred within a certain time after the establishment of the connection by the connection re-establishment procedure.

17. The apparatus according to claim 16, wherein the at least one memory and the instructions are further configured to, with the at least one processor, cause the apparatus at least to perform: initializing, at the user equipment, a timer in response to detecting the establishment of the connection to the cell by the connection re-establishment procedure,
stopping, at the user equipment, the timer in response to detecting the radio link failure of the connection to the cell, wherein the indication in the message is the time measured by the timer.

18. The apparatus according to claim 16, wherein the at least one memory and the instructions are further configured to, with the at least one processor, cause the apparatus at least to perform:
initializing, at the user equipment, a timer in response to detecting the establishment of the connection to the cell,
stopping, at the user equipment, the timer in response to detecting the radio link failure of the connection to the cell, and in response to the connection being established by the connection re-establishment procedure, setting a parameter indicating that the connection is established by the connection re-establishment procedure, wherein the indication in the message is the time measured by the timer and the parameter.

19. The apparatus according to claim 16, wherein the at least one memory and the instructions are further configured to, with the at least one processor, cause the apparatus at least to perform: initializing, at the user equipment, a timer in response to detecting the establishment of the connection to the cell by the connection re-establishment procedure,
  determining, at the user equipment, whether the timer has expired in response to detecting the radio link failure of the connection to the cell,
  setting, at the user equipment, a parameter indicating whether the timer has expired or not in response to detecting the radio link failure, wherein the indication in the message is the parameter.

20. A computer program product comprising a non-transitory computer-readable medium including a program for a processing device, the program comprising software code portions causing the processing device to perform the method of claim 1 when the program is run on the processing device.

* * * * *